(No Model.)
A. RECKENZAUN.
SECONDARY BATTERY.
No. 371,358. Patented Oct. 11, 1887.
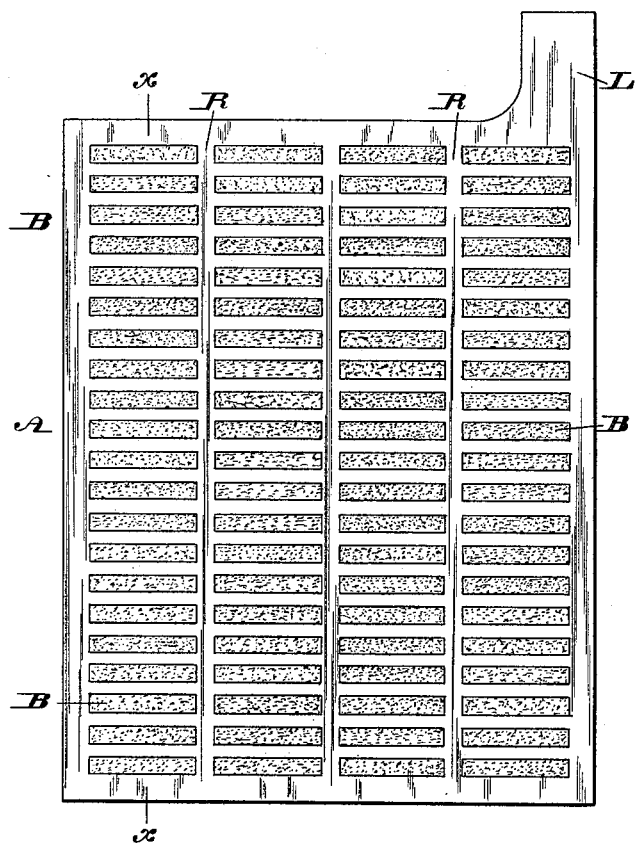
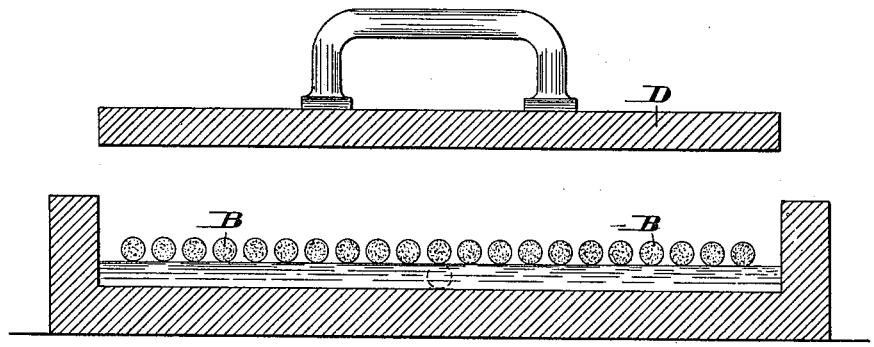
WITNESSES:
Th. Rollé
James F. Kelly
INVENTOR:
Anthony Reckenzaun
BY
ATTORNEYS.

United States Patent Office.

ANTHONY RECKENZAUN, OF LONDON, COUNTY OF ESSEX, ENGLAND.

SECONDARY BATTERY.

SPECIFICATION forming part of Letters Patent No. 371,358, dated October 11, 1887.

Application filed July 14, 1887. Serial No. 244,292. (No model.) Patented in England June 25, 1886, No. 8,379.

*To all whom it may concern:*

Be it known that I, ANTHONY RECKENZAUN, a subject of the Queen of Great Britain, residing in London, England, have invented a new and useful Improvement in Secondary Batteries, which improvement is fully set forth in the following specification and accompanying drawings.

My invention relates to secondary batteries; and to this end it consists in a novel form of electrode or plate therefor, as well as a novel method of making the same, for which I have obtained a patent in Great Britain, No. 8,379, bearing date of June 25, 1886.

Prior to my invention it was old in the art to construct the electrodes or plates with perforations, indentations, or shelves and to apply the active material in said retaining apparatus mechanically under pressure and otherwise. It was also old to construct them with double conical holes in such manner as to expose the enlarged or base ends of the cones, and then to fill these holes with the oxide or active material. These forms of electrodes or plates are open to the objection that the active material readily crumbles away and the plates become weakened and broken, objections which I avoid with my improved form of plate. It was also old, as I am aware, to mix the active material with molten lead by stirring it into the molten lead to form an integral mass therewith; but this form necessarily places much of the active material in the body of the plate or electrode, where it is useless, and only serves to weaken it. I am also aware that it was old to mix the active material with lead while in a plastic condition, and then mold or form the electrode or plate from this plastic mass by hand or otherwise. I am also aware that it was old in the art to form an electrode for secondary batteries by casting molten lead about or around studs or double conoidal pieces of active material, and to then allow the mass to cool.

My invention differs from all of these known forms in that it consists in forming the plate or electrode by forcing the active material into a body of molten lead by pressure and then allowing the mass to cool.

It also consists in a novel form of electrode having active material disposed in the nature or shape of cylindrical particles parallel to the edges of the retaining-plates and equally exposed on both sides thereof. It will be understood by reference to the accompanying drawings, in which—

Figure 1 is a side elevation of an electrode or plate constructed in accordance with my process. Fig. 2 is a partial cross-section of Fig. 1, taken on line $x$ $x$. Fig. 3 is a cross-section of a mold containing molten lead with particles of active material resting thereon arranged to be forced into the molten lead, as will be explained.

Similar letters of reference indicate corresponding parts in the several figures.

Referring to the drawings, A is the finished electrode or plate, having the usual lug, L, and being of lead or lead and its alloys or any other material.

B B B B are the pellets or particles of active material of well-known matter, such as spongy or porous lead.

Fig. 3 shows the mold for making the electrode, and it is made of stone, iron, sand, or any desired material—such as is ordinarily used in casting—and is made in two parts, as shown in Fig. 4.

I will now describe the method or process of making my improved electrode for secondary batteries, which is as follows: I pour molten lead into the mold, as shown in Fig. 3, and then, while the lead still remains in liquid form, I distribute the pellets or cylinders of active material over the surface of the molten lead. These pellets are of less specific gravity than the molten lead, and hence float upon its surface. I then place the heavy cover D inside the mold and allow it to settle upon the pellets or particles of active material, thus forcibly thrusting them down into the molten lead. The mass is now allowed to cool slowly, after which the cover D is removed and the electrode turned out of the mold. These pellets or particles of active material are so distributed as to be arranged in rows, as shown clearly in Fig. 1.

It will be seen that by this construction my electrode is very strong, having ribs R R R running from end to end, and a side and end rib running entirely around it, and all serving as a good conductor, while the particles of active material B B are embedded in the double concave grooves of the plate and lie in the plane thereof, having their lateral faces equally exposed upon both sides of said retaining-plate. It will also be seen that the active material is evenly distributed on both faces of the electrode, and that I have a large surface of such material with a comparatively small surface of retaining material, while the electrode itself is less liable to buckle.

After the electrode has been cast I dress or plane its faces down with a plane or file or any desired tool, so as to remove any metallic lead which may cover the faces of the pellets or cylinders. Fig. 2 shows an electrode so dressed.

Having thus described my invention, what I claim as new, and desire to secure by Letters Patent, is—

1. The within-described method of constructing secondary-battery electrodes, consisting in distributing the active material over the surface of a body of molten lead, then forcing said active material beneath the surface of the molten mass, and finally allowing the whole to cool, substantially as described.

2. An electrode for secondary batteries, consisting of a retaining-plate having a series of double concave grooves parallel to its edges, and containing therein cylindrical pieces of active material exposed equally on both sides of the plate, the exposed portions being the lateral faces of the cylinders, substantially as described.

3. An electrode for secondary batteries, consisting of a retaining-plate with vertical ribs R and horizontal double concave retaining-grooves lying in the plane of the plate, and having cylindrical pieces of active material located in said grooves and equally exposed upon both sides of said plate, substantially as described.

ANTHONY RECKENZAUN.

Witnesses:
JOHN A. WIEDERSHEIM,
A. P. JENNINGS.